United States Patent
Lau

(10) Patent No.: US 11,330,832 B2
(45) Date of Patent: May 17, 2022

(54) PRE-COOKED INSTANT FOOD PRODUCT AND PROCESS FOR PREPARING IT

(71) Applicant: Zun Yang Enterprises Ltd., Richmond (CA)

(72) Inventor: Jim Hon Leung Lau, Richmond (CA)

(73) Assignee: Zun Yang Enterprises Ltd., Calgary (CA)

( * ) Notice: Subject to any disclaimer, the term of this patent is extended or adjusted under 35 U.S.C. 154(b) by 401 days.

(21) Appl. No.: 15/680,413

(22) Filed: Aug. 18, 2017

(65) Prior Publication Data
US 2019/0053519 A1 Feb. 21, 2019

(51) Int. Cl.
| | | |
|---|---|---|
| *A23L 7/113* | (2016.01) | |
| *A23L 5/10* | (2016.01) | |
| *A23L 3/358* | (2006.01) | |
| *A47J 27/04* | (2006.01) | |
| *B65B 11/00* | (2006.01) | |
| *B65B 31/00* | (2006.01) | |
| *B65B 63/08* | (2006.01) | |
| *B65B 25/00* | (2006.01) | |
| *B65D 65/38* | (2006.01) | |
| *B65D 81/20* | (2006.01) | |
| *B65D 81/28* | (2006.01) | |
| *B65D 77/02* | (2006.01) | |
| *B65B 29/08* | (2006.01) | |
| *A23L 3/3418* | (2006.01) | |
| *A47J 27/00* | (2006.01) | |
| *B65B 3/00* | (2006.01) | |

(52) U.S. Cl.
CPC ............. *A23L 7/113* (2016.08); *A23L 3/3418* (2013.01); *A23L 3/358* (2013.01); *A23L 5/13* (2016.08); *A47J 27/04* (2013.01); *B65B 11/004* (2013.01); *B65B 25/001* (2013.01); *B65B 29/08* (2013.01); *B65B 31/00* (2013.01); *B65B 63/08* (2013.01); *B65D 65/38* (2013.01); *B65D 77/02* (2013.01); *B65D 81/2007* (2013.01); *B65D 81/28* (2013.01); *A23V 2002/00* (2013.01); *A47J 2027/006* (2013.01); *A47J 2027/043* (2013.01); *B65B 3/00* (2013.01); *B65B 2220/24* (2013.01)

(58) Field of Classification Search
CPC . A23L 7/113; A23L 5/13; A23L 3/358; A23L 3/3418; B65B 25/001; B65B 29/08; B65B 11/004; B65B 31/00; B65D 77/02; B65D 81/28; B65D 81/2007; B65D 65/38
See application file for complete search history.

(56) References Cited

U.S. PATENT DOCUMENTS

| | | | |
|---|---|---|---|
| 5,332,587 A | 7/1994 | Howard et al. | |
| 5,707,672 A * | 1/1998 | Taguchi | A23L 3/02 |
| | | | 422/26 |
| 5,916,620 A | 6/1999 | Oh | |
| 6,896,925 B2 | 5/2005 | Sidoti et al. | |
| 7,402,326 B2 * | 7/2008 | Sakamaki | B65B 25/001 |
| | | | 426/451 |

OTHER PUBLICATIONS

Fellows, PJ "Food Processing technology Principles and practice 2nd Edition" CRC Press 2000, pp. 387, 462, 481 and 482 (Year: 2000).*
Chen, Jason "How to Cook Pasta Correctly" pp. May 1-20, 2011 https://lifehacker.com/how-to-cook-pasta-correctly-5805897 (Year: 2011).*
Leah "No Mess Camping Omeletts in a Bag" pp. 1-8 May 2016 https://www.beyerbeware.net/2011/06/no-mess-camping-omelettes-in-a-bag.html (Year: 2016).*
Fellows "Food Processing technology Principles and practice 2nd Edition" CRC Press 2000, pp. 242 and 243 (Year: 2000).*
Potter et al "Food Science 5th Edition" Chapman and Hall 1995 p. 503 (Year: 1995).*
International Search Report and Written Opinion of the International Search Authority, pp. 1-9 dated Nov. 1, 2018.

* cited by examiner

*Primary Examiner* — Vera Stulii

(57) ABSTRACT

Examples of a pre-cooked instant food products and a process for preparing such food products are described. The process comprises the steps of i) steaming the food product for pre-determined time; ii) immersing the steamed food product in a high concentration cooled brine solution; iii) removing excess water from the surface of the food product; iv) packing a pre-determined amount of the food product into a container and sealing such container, and v) storing the containers of pre-cooked instant food products at temperatures of 2° C. or lower. The container is made of a material safe for keeping food products and is able to withstand temperatures higher than 90° C. The surface of the food product is coated with the salt from the brine solution to preserve it.

12 Claims, 1 Drawing Sheet

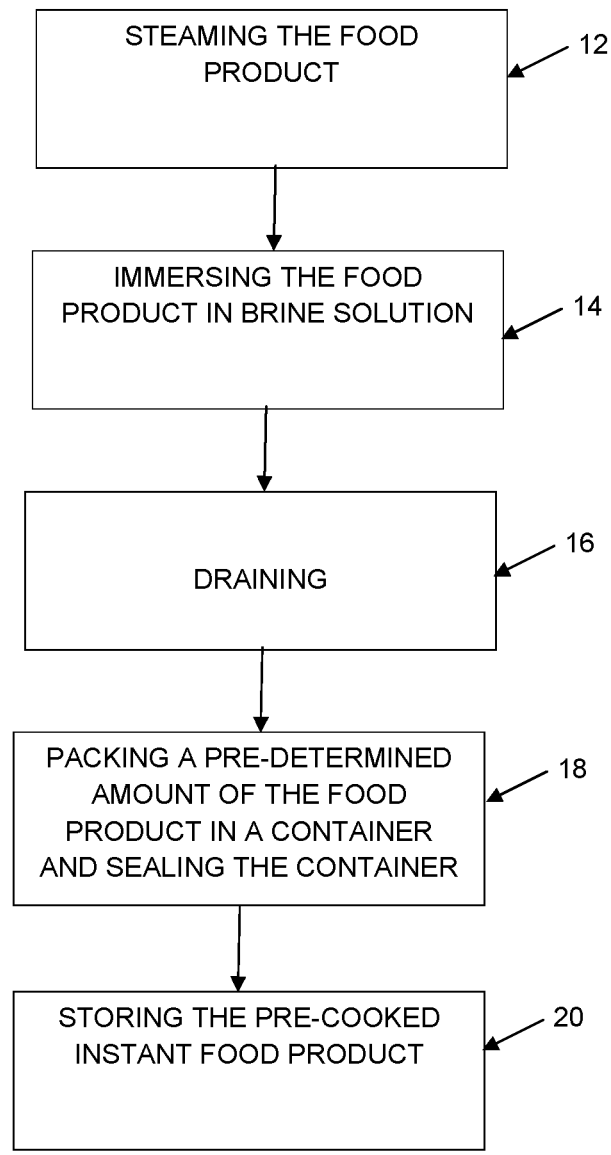

PRE-COOKED INSTANT FOOD PRODUCT AND PROCESS FOR PREPARING IT

TECHNICAL FIELD

The present disclosure generally relates to pre-cooked instant food products and a process for preparing such pre-cooked instant food products.

BACKGROUND

Unless otherwise indicated herein, the materials described in this section are not prior art to the claims in this application and are not admitted to be prior art by inclusion in this section.

Instant food products generally include a dehydrated food product, such as for example dehydrated pasta dough (hardened uncooked mixture of flour, eggs and water). Such dehydrated food products have a relatively long shelf life and are relatively easy to prepare compare to making the product for scratch. For example, dehydrated instant pasta needs to cook for about 10-15 minutes in a warm water in order to absorb water and softens. In order to further speed the cooking process, some instant products include pre-cooked food product that is dehydrated after the cooking. One problem with dehydrated instant food products (whether pre-cooked or not) is that after cooking such products loose the texture and taste of a freshly made products and need one or more ingredients to improve the taste and appearance to appeal to the consumer.

Freshly made food products on the other hand have profound taste in comparison to any instant food product, however, such freshly made food products have very short shelf life. Any cooked freshly made food product needs to be consumed immediately otherwise it changes texture and taste within couple of hours and any process of re-heating fails to bring the quality of the product to the same level as when the product was just cooked. One can keep the cooked products on a hot plate in order to keep the products ready for consumption before serving however, the taste of the products, e.g. pasta, deteriorate with time and keeping the pasta for more than two hours on the hot plate is unacceptable.

Being able to have a pre-cooked instant food products that can be quickly re-heated while still keeping the taste and texture is important in cases when a large quantities of food needs to be prepared and cooked within a very limited time limit, such as for example, in restaurant businesses where a large quantity of food products need to be prepared and cooked in less than an hour or even much faster.

SUMMARY

In one aspect, a process for preparing a pre-cooked instant food product is provided. The process comprises the steps of i) steaming the food product for a pre-determined time; ii) immersing the steamed food product in a high concentration cooled brine solution for about 5 to 15 minutes; iii) removing excess water from the surface of the food product for up to about 10 minutes; iv) packing a pre-determined amount of the food product into a container and sealing such container, and v) storing the containers filled with the pre-cooked instant food products at temperatures of 2° C. or lower. The container is made of a material safe for keeping food products and is able to withstand temperatures higher than 90° C. In one embodiment the food product is freshly made pasta.

In another aspect, a system for processing a pre-cooked instant food product is provided. The system comprises a steamer for steaming the food product, a vessel containing a high concentration cooled brine solution to immense the steamed food product into the cooled brine solution, a draining means for removing excess water from the surface of the food product, a packing means to pack a pre-determined amount of a drained food product into a suitable container and a storing means for storing the containers filled with pre-cooked instant food product.

In addition to the aspects and embodiments described above, further aspects and embodiments will become apparent by reference to the drawings and study of the following detailed description.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure. Sizes and relative positions of elements in the drawings are not necessarily drawn to scale. For example, the shapes of various elements and angles are not drawn to scale, and some of these elements are arbitrarily enlarged and positioned to improve drawing legibility.

FIG. 1 is a flow chart of an example of a process for preparing a pre-cooked instant food product.

DETAILED DESCRIPTION OF SPECIFIC EMBODIMENTS

As required, detailed embodiments of the present invention are disclosed herein, however, it is to be understood that the disclosed embodiments are merely exemplary of the invention, which may be embodied in various forms. The present invention is described with respect to a pre-cooked instant pasta products and a process for preparation such pre-cooked instant pasta, but one skilled in the art would recognize that the process subject to this invention may be used in, for instance, preparing other pre-cooked instant food products, such as for example, vegetables, legumes, rice, etc.

FIG. 1 illustrates a flow chart of a process of making a pre-cooked instant pasta according to one example of the present invention. A pasta dough is made in accordance with the general practice where flour is combined with water and other ingredients to obtain the desired consistency and is then kneaded to make the dough. The dough is then formed and cut into pieces of desired shape and size. The freshly prepared pasta is then in step 12 steamed in a steamer for few minutes (~3-10 minutes) to cook the pasta so that it is tender yet still firm. Person skilled in the art would understand that in case of other food products, e.g. legumes or rice, the steaming process may be longer than 10 minutes. For example, the food product can be steamed for about 30 minutes or more (until is properly cooked) without departing from the scope of the invention. Cooked pasta is then conveyed through a vessel filled with a brine solution in step 14. The brine solution can contain 10-20% salt (sodium chloride) dissolved in water. The brine solution can be cooled to few degrees Celsius (2-4° C.) before the pasta is immersed therein. Person skilled in the art would understand that the amount of salt in the solution can be less than 10% or more than 20% without departing from the scope of invention. Dipping the pasta into the cool brine can provide a salt coating on a surface of the pasta to preserve the pasta and enhance its taste. Also dipping the pasta in a cool brine solution will stop the cooking process. The pasta is left into the brine for few minutes (~5-15 min.) until the pasta is cooled down to, for example, less than 6° C. In step 16, the pasta is drained to release any excess water. For example, the pasta is put in a strainer or any other meshed device to drain the pasta for about 3-15 minutes. Once the pasta is drained, a pre-determined amount of the pasta is packed in a container and the container is sealed (step 18). The sealed container filled with the pre-cooked pasta is then stored at temperature of 2° C. or lower (step 20). The container can be any type of container that is safe for keeping food products and which can withstand temperatures of at least 90° C. or more. In some implementations, the container can withstand a temperature of at least 130° C. For example, the container can be a high density polyvinyl bag, aluminum bag or any combination of a plastic or metal or any other suitable material which is safe for packing food products and can withstand high temperatures. The food products prepared according the process described herein above, with reference to FIG. 1, can be stored for few weeks without sacrificing the quality of the product. In one implementation, an additional step of evacuating the air out of the sealed container is provided to further increase the shelf life of the food product. In one implementation, a liner is provided to wrap around the food product to separate the food product from the inner wall of the container. For example, the liner can be a grape leaf, a bamboo leaf, a lotus leaf, corn leaf or any other suitable natural liner which is suitable and safe for consumption and/or wrapping food products. The liner can separate the food product from the container and can help to maintain its texture and also to add flavor (aroma) and taste to the food product.

To serve the pre-cooked instant food product (e.g. the pre-cooked instant pasta) made according to the process of the present invention one just need to put the sealed container in a hot water bath, warmed at about 90° C., for about 30 minutes and then take the container out of the water bath, break the seal to open the container and serve the pasta ready for consumption. The required time for warming up the pre-cooked instant food products can be less or more than 30 minutes depending on the properties of the container used for packing the product. For example, food product packed in a container made of a material with greater thermal conductivity will warm up faster than the one packed in a container made of a material with smaller thermal conductivity. Also, food product packed in a thinner polyvinyl bag will warm up faster than the one packed in a thicker bag. The pre-cooked instant pasta can be kept in the hot water bath for up to about 8 hours, without deteriorating the taste or the quality of the product, as long as the container does not leak. So, the containers should be sealed tightly, such that will not split and leaked when immerged for prolong time in water bath at high temperature. Since the food product is pre-cooked before is sealed, it is stabilized and as long as no additional water (moisture) is added therein, keeping the containers in the water bath for prolong time will not cause overcooking of the product. This can provide that more than one container can be placed in the water bath at the same time (i.e., tens or hundreds of containers), which can be taken out at the same or different time, to be served to customers. The pre-cooked instant food products prepared by the process of the present invention provide cooked food product with consistent quality without having chef skills and experience.

While particular elements, embodiments and applications of the present disclosure have been shown and described, it will be understood, that the scope of the disclosure is not limited thereto, since modifications can be made by those skilled in the art without departing from the scope of the present disclosure, particularly in light of the foregoing teachings. Thus, for example, in any method or process disclosed herein, the acts or operations making up the method/process may be performed in any suitable sequence and are not necessarily limited to any particular disclosed sequence. Elements and components can be configured or arranged differently, combined, and/or eliminated in various embodiments. The various features and processes described above may be used independently of one another, or may be combined in various ways. All possible combinations and subcombinations are intended to fall within the scope of this disclosure.

Reference throughout this disclosure to "some embodiments," "an embodiment," or the like, means that a particular feature, structure, step, process, or characteristic described in connection with the embodiment is included in at least one embodiment. Thus, appearances of the phrases "in some embodiments," "in an embodiment," or the like, throughout this disclosure are not necessarily all referring to the same embodiment and may refer to one or more of the same or different embodiments.

Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without operator input or prompting, whether these features, elements and/or steps are included or are to be performed in any particular embodiment. No single feature or group of features is required for or indispensable to any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The example calculations, simulations, results, graphs, values, and parameters of the embodiments described herein are intended to illustrate and not to limit the disclosed embodiments. Other embodiments can be configured and/or operated differently than the illustrative examples described herein

The invention claimed is:

1. A process for making a pre-cooked instant food product comprising the steps of:
  i) steaming the food product under atmospheric pressure for a pre-determine time to cook the food product;

ii) immersing the steamed pre-cooked food product in 10-30% salt concentration cold brine solution for about 5 to 15 minutes, the brine solution cooled to temperatures of about 2-4° C.;

iii) forming a salt coating adhered on the surface of the pre-cooked food product during immersion in the cold brine solution;

iv) removing excess water by draining for about 3 to 15 minutes to obtain drained food product, the salt coating remaining adhered on the surface of the food product after the excess water is removed;

v packing a pre-determined amount of the salt-coated pre-cooked food product into a container, the container made of a material safe for keeping food products therein; and vi sealing the container tightly, wherein the sealed container containing the pre-determined amount of salt-coated pre-cooked food product is used as a container in a warming step, the sealed container being able to withstand temperatures higher than 90° C. without breaking the seal therefore preventing leakage of water into the container, preventing contact of the water with the food product and keeping a water content in the food product constant during the warming step of the food product.

2. The process of claim 1 further comprising a step of storing the containers filled with the pre-cooked food product at temperatures of 2° C. or lower.

3. The process of claim 1 further comprising a step of wrapping the pre-cooked food product in a liner.

4. The process of claim 1 further comprising a step of evacuating air out of the sealed container.

5. A process for making a pre-cooked instant pasta comprising the steps of:
   i) steaming freshly made pasta under atmospheric pressure for a pre-determine time to cook the pasta;
   ii) immersing the pre-cooked steamed pasta in 10-30% salt concentration cold brine solution for about 5 to 15 minutes, the brine solution cooled to temperatures of about 2-4° C. to stop cooking of the pasta;
   iii) forming a salt coating adhered on the surface of the pre-cooked pasta during immersion in the cold brine solution;
   iv) removing excess water by draining for about 10 minutes to obtain drained pasta, the salt coating remaining adhered on the surface of the pasta after the excess water is removed;
   v) packing a pre-determined amount of salt-coated pre-cooked pasta into a container, the container made of a material safe for keeping pasta therein; and
   vi) sealing the container tightly, wherein the sealed package container containing the pre-determined amount of salt-coated pre-cooked pasta is used as a container in a warming step, the sealed container being able to withstand temperatures higher than 90° C. without breaking the seal therefore preventing leakage of water into the container and preventing contact of the water with the food product and keeping a water content in the pasta constant during the warming step of the pasta.

6. The process of claim 5 further comprising a step of storing the containers filled with the pre-cooked pasta at temperatures of 2° C. or lower.

7. The process of claim 5 further comprising a step of wrapping the pre-cooked pasta in a liner.

8. The process of claim 5 further comprising a step of evacuating air out of the sealed container.

9. The process of claim 1, wherein the warming step comprises a step of putting a tightly sealed container containing the pre-cooked instant food product into a hot water bath that is being heated at temperature of about 90° C. for 15 minutes to 8 hours to heat the pre-cooked instant food product and keep it warm.

10. The process of claim 9, wherein multiple containers can be positioned into the hot water bath at the same time.

11. The process of claim 5, wherein the warming step comprises a step of putting a sealed container containing the pre-cooked pasta into a hot water bath that is being heated at temperature of about 90° C. for 15 minutes to 8 hours to heat the pre-cooked instant pasta and keep it warm.

12. The process of claim 11, wherein multiple containers can be positioned into the hot water bath at the same time.

* * * * *